United States Patent
Brookman

(10) Patent No.: US 8,323,389 B2
(45) Date of Patent: Dec. 4, 2012

(54) KITCHEN HOOD VENT AND SCRUBBER

(76) Inventor: David L. Brookman, Oriental, NC (US)

( * ) Notice: Subject to any disclaimer, the term of this patent is extended or adjusted under 35 U.S.C. 154(b) by 580 days.

(21) Appl. No.: 12/409,481

(22) Filed: Mar. 23, 2009

(65) Prior Publication Data

US 2009/0235819 A1    Sep. 24, 2009

Related U.S. Application Data

(60) Provisional application No. 61/070,335, filed on Mar. 24, 2008.

(51) Int. Cl.
*B01D 53/14* (2006.01)
*B01D 47/02* (2006.01)

(52) U.S. Cl. ............ 96/274; 96/256; 96/265; 96/267; 96/322; 96/371; 55/DIG. 36; 126/299 E

(58) Field of Classification Search .......... None
See application file for complete search history.

(56) References Cited

U.S. PATENT DOCUMENTS

| | | | |
|---|---|---|---|
| 3,207,058 A * | 9/1965 | Gaylord | 126/299 E |
| 3,248,858 A * | 5/1966 | Toke | 96/249 |
| 3,494,108 A * | 2/1970 | Moragne | 96/233 |
| 3,664,255 A * | 5/1972 | Kuechler | 126/299 D |
| 3,710,551 A * | 1/1973 | Sved | 96/258 |
| 3,805,685 A * | 4/1974 | Carns | 126/299 E |
| 3,811,252 A * | 5/1974 | Evans et al. | 96/237 |
| 3,856,487 A * | 12/1974 | Perez | 96/240 |
| 3,960,524 A * | 6/1976 | Cumpston, Jr. | 95/151 |
| 4,038,912 A | 8/1977 | Kuechler | |
| 4,043,319 A | 8/1977 | Jensen | |
| 4,109,641 A | 8/1978 | Hunzicker | |
| 4,117,833 A | 10/1978 | Mueller | |
| 4,143,645 A | 3/1979 | Blumberg | |
| 4,146,017 A | 3/1979 | Overton | |
| 4,153,044 A | 5/1979 | Nett | |
| 4,259,944 A | 4/1981 | Kalthoff | |
| 4,266,528 A | 5/1981 | Barnhart et al. | |
| 4,286,572 A | 9/1981 | Searcy et al. | |
| 4,346,692 A | 8/1982 | McCauley | |
| 4,351,652 A * | 9/1982 | Wisting | 96/265 |
| 4,608,064 A * | 8/1986 | Napadow | 96/307 |
| 4,738,244 A * | 4/1988 | Welsh | 126/299 R |
| 4,753,218 A * | 6/1988 | Potter | 126/299 E |
| 4,944,782 A | 7/1990 | Rajendran | |
| 5,069,197 A * | 12/1991 | Wisting | 126/299 E |
| 5,141,538 A * | 8/1992 | Derington et al. | 96/329 |
| 5,205,846 A * | 4/1993 | Fabrizi | 96/121 |
| 5,394,861 A | 3/1995 | Stegmaier | |

(Continued)

*Primary Examiner* — Duane Smith
*Assistant Examiner* — Pankti Patel
(74) *Attorney, Agent, or Firm* — File-EE-Patents.com; Jay A. Chesavage

(57) ABSTRACT

An air scrubber for removing oils and contaminates from air has an underside inlet for the introduction of contaminated air. The contaminated air passes through a reduced aperture passageway which prevents retrograde flow of contaminates or cleaning fluids contained in the scrubber. The contaminated air is thereafter directed upwards through a scrub reservoir having a plurality of apertures, such that the contaminated air passing through the apertures forms jets which cause interaction between the cleaning fluid and the contaminates, thereby creating droplets containing cleaning fluid with entrapped contaminates, and cleaned air. The droplets and air are directed to a mist eliminator having a plurality of chevron V structures which capture the droplets and return them to the main reservoir. A circulating pump moves cleaning fluid from the main reservoir to an upper reservoir which spills into the cleaning reservoir.

19 Claims, 7 Drawing Sheets

U.S. PATENT DOCUMENTS

| | | |
|---|---|---|
| 5,472,342 A | 12/1995 | Welsh et al. |
| 5,641,338 A * | 6/1997 | Brookman ..................... 95/213 |
| 5,642,784 A | 7/1997 | Guay et al. |
| 5,662,097 A | 9/1997 | Panos |
| 5,874,292 A | 2/1999 | McMinn |
| 6,182,653 B1 | 2/2001 | Otenbaker et al. |
| 6,223,741 B1 | 5/2001 | Panos |
| 6,235,090 B1 | 5/2001 | Bernstein et al. |
| 6,274,375 B1 | 8/2001 | McMinn |
| 6,732,729 B2 | 5/2004 | Yeung |
| 6,913,014 B2 | 7/2005 | Chiang |
| 7,025,336 B2 * | 4/2006 | Wynn, II ......................... 261/30 |
| 7,252,807 B2 * | 8/2007 | Hopkins ........................ 422/168 |
| 7,422,613 B2 | 9/2008 | Bockle et al. |
| 7,614,396 B2 * | 11/2009 | So ............................. 126/299 E |
| 2003/0056648 A1 * | 3/2003 | Fornai et al. ...................... 95/65 |
| 2005/0061309 A1 * | 3/2005 | Gallagher ................ 126/299 E |
| 2009/0264060 A1 * | 10/2009 | Livchak et al. ................. 454/61 |
| 2009/0320688 A1 * | 12/2009 | Lackner et al. ................. 96/257 |

* cited by examiner

Kitchen Hood Scrubber Side View

Section A-A of Fig 1
Top View

Main Reservoir Level Regulation

Pump protection
(background process)

Reservoir fill/blowdown
(background process)

Start-up process
(pump protection process in background)

Blow-down sequence
(after startup sequence)

Surfactant Sequence

Scrub Reservoir Aperture Cleaner

Shutdown Sequence

KITCHEN HOOD VENT AND SCRUBBER

RELATED APPLICATIONS

The present application claims priority of U.S. Provisional Pat. No. 61/070,335 filed Mar. 24, 2008.

FIELD OF THE INVENTION

The present invention relates to an air cleaner. More particularly, the present invention relates to an air scrubber and degreaser for use above a cooking surface, the air cleaner accepting contaminated air having a mixture of cooking vapors and oils in aerosol form, separating the contaminants by placing them in solution with a cleaning fluid which is returned to a main reservoir, thereby exhausting clean air.

BACKGROUND OF THE INVENTION

Kitchen air cleaners are well known in the field of air handling equipment. A typical kitchen vent hood includes a grease trap such as a removable mesh for capturing airborne oils drawn through by a fan and delivered to an exhaust vent. Cooking vapors are drawn through the mesh which inefficiently captures a fraction of the airborne oils and grease, and the contained grease is extracted from the mesh by disassembling the vent hood and removing the mesh, using a degreaser to release the captured oils, thereafter reassembling the mesh back into the vent hood. Examples of such grease trapping hood systems are shown in U.S. Pat. Nos. 4,7388,244 by Welsh and 5,394,861 by Stegmaier.

A specific risk for kitchen hoods is a hood fire, whereby combustible fats and oils which collect in the hood over time are ignited by a subsequent kitchen flare-up on the cooktop surface below, igniting the entrapped oils and fats. In this scenario, the vigorous fans of the draft hood provide a ready and continuous source of combustion air, and the fire may extend laterally through the vents of the hood, which usually contain depositions of fats and oils which have accumulated. Because of this risk, prior art kitchen hoods include significant structure related to fire suppression, such as U.S. Pat. Nos. 5,642,784 by Guay et al, 4,784,114 by Muckler et al, and 4,944,782 by Rajadran et al.

Additionally, some municipalities may require vigorous control of emitted particulates and odors, further increasing the particulate filtering requirement, which may be satisfied using carbon filters, electrostatic filtering, and the like, which require large surface areas to prevent airflow restriction or otherwise reduce airflow for satisfactory operation.

Industrial air scrubbers are well known in the art of pollution control. U.S. Pat. Nos. 4,388,090 and 5,938,820 describe the mixing of polluted air with a fluid to form a mixture which includes pollutants in solution, which solution is placed into a series of settling tanks for separation and isolation of the pollutants. U.S. Pat. Nos. 4,227,895, 5,085,673, 5,846,303 and 5,292,353 describe an air scrubber which operates by impinging the contaminated air onto a series of baffles which are sprayed with the contaminated solution. U.S. Pat. No. 5,641,338 describes a scrubber which includes a water tray for passing contaminated air through water.

A kitchen hood/cleaner is desired which receives contaminated air from a cooktop surface, removes the contaminates such as particulates and aerosols, provides a mechanism for periodic self-cleaning of the hood which purges the contaminates that have been trapped, and provides fire suppression and containment for cooktop fires.

OBJECTS OF THE INVENTION

A first object of the invention is a combination kitchen hood and air cleaner/scrubber which directs contaminated intake air containing micro particulates such as smoke, and macro particulates such as aerosol oils, from an underside rectangular air inlet to a reduced width passageway for increasing air velocity, thereby ensuring positive intake flow for micro and macro particles, adding cleaning fluid droplets to the contaminated air stream and directing the contaminated air to the bottom surface of a scrub reservoir which is wetted by the cleaning fluid droplets and subsequently passing the contaminated air through the apertures of the bottom surface of the scrub reservoir for the contaminated air to form jets through the scrub reservoir, thereby placing contaminates directly into solution or emulsion, and forming droplets containing contaminates in solution with cleaning fluid, and clean air, the droplets and air which are together directed to a mist eliminator comprising a plurality of chevron baffles for trapping the droplets and draining them back to the main reservoir, the main reservoir also having a recirculation outlet coupled to a circulating pump which delivers fluid into an upper reservoir which includes a spillway which empties into the scrub reservoir.

A second object of the invention is an air cleaner/scrubber which collects contaminates in a solution or emulsion form into a main reservoir having a dam leading to an overflow drain, the main reservoir also having a fill mechanism which regulates the main reservoir level below the level of the dam leading to the overflow drain in an operational mode, and during a blowdown cycle, overfilling the main reservoir such that contaminates flow over the dam and to the overflow drain while the cleaner continues to remove contaminates from incoming air.

A third object of the invention is an air cleaner/scrubber which provides fire suppression for combustible contaminated air by directing the combustible contaminated air through a scrub reservoir containing a non-combustible fluid such as water, the scrub reservoir further having a lower surface which contains a plurality of apertures for the passage of the combustible contaminated air, the apertures and passage through the non-combustible fluid resulting in the suppression of combustion and cooling of combustion products which pass through the scrub reservoir.

A fourth object of the invention is a process for removing contaminants from air, the process having:

a first step of directing contaminated air containing contaminates upward to a passageway for directing the contaminated air through a region for providing droplets of cleaning fluid to the contaminated air which is then directed to a scrub reservoir having a plurality of apertures and containing the cleaning fluid, the plurality of apertures for creating jets of contaminated air through the cleaning fluid and enhancing the interaction of the contaminated air and cleaning fluid, the jets resulting in the generation of droplets containing cleaning fluid mixed with contaminates, and clean air;

a subsequent second step of directing the mixture of contaminate droplets mixed with clean air through a mist eliminator having a plurality of chevron impingement structures maximizing surface contact with the droplets, substantially trapping the droplets and draining them to the main reservoir;

thereafter directing the cleaned air to an exhaust vent.

A fifth object of the invention is cleaning contaminated air by passing the contaminated air through a scrub reservoir containing a mixture of water and a surfactant, the scrub reservoir having a plurality of apertures in a lower surface, the contaminated air passing through the scrub reservoir apertures and forming jets for increased interaction of the water and surfactant, thereby resulting in improved efficiency in removal of the contaminates, with the addition of surfactant to the water resulting in a reduced pressure drop across the scrub reservoir.

SUMMARY OF THE INVENTION

A combination kitchen hood air cleaner and scrubber/degreaser accepts contaminated air containing contaminates such as oils and animal fats in vapor or aerosol form, and particulates such as smoke from a lower surface air inlet, thereafter increases the contaminated air velocity using a reduced area aperture to ensure positive intake, and directs the contaminated air through a pre-wet section which introduces droplets of cleaning fluid into the contaminated air stream, which is thereafter directed to the bottom surface of a scrub reservoir containing apertures, and the introduction of cleaning fluid into the contaminated air stream reduces the buildup of contamination in and around the apertures. The cleaning fluid is stored in, and pumped fluid drains back to, a main reservoir which contains the cleaning fluid such as water mixed with a non-foaming surfactant, or alternatively, the cleaning fluid can be any soluble solution for the contaminates to be removed from the contaminated air. The stream of contaminated air with cleaning fluid droplets is directed upward through apertures on the bottom surface of the scrub reservoir containing the cleaning fluid. Contaminated air which passes through the apertures of the scrub reservoir form jets through the cleaning fluid, the jets maximizing the interaction between the contaminated air and the cleaning fluid. Most of the contaminates are captured in solution by the jets, and remaining droplets of contaminates mixed with the cleaning fluid and cleaned air are thereafter directed through a mist eliminator which captures the droplets and returns them to the main reservoir. The cleaned air which exits the mist eliminator is directed over a dam which defines one edge of the main reservoir, and thereafter to an exhaust vent. The scrub reservoir additionally affords fire protection, acting as a water barrier for combustion products drawn into the cleaner. Additionally, a self-cleaning mode is provided by the main reservoir dam which is part of a blow-down cleaning mode whereby overfilling of the main reservoir causes oils which collect in the main reservoir (either at the surface or in emulsion with the cleaning fluid) to spill over the dam and to an overflow drain for removal from the hood simultaneously with the air cleaning functions. In one embodiment of the invention, the basic contaminated air stream entering the scrub reservoir is divided into numerous, very small jet streams as the contaminated air is directed through a perforated plate which forms the bottom of the scrub reservoir. This results in a large increase in the exposed surface contact between the streams of contaminated air and the flowing bed of liquid in the scrub reservoir, with a very high liquid-to-air interaction which is provided by a surfactant which is mixed with the water which forms the cleaning fluid of the scrub reservoir. The pollutants are absorbed on the liquid surfaces at the plate interface. A non foaming surfactant is an integral component of the cleaning fluid. The surfactant eliminates the surface tension between the gas stream and liquid which permits the efficient wetting of all surfaces. This reduction of surface tension permits the high collection efficiency of this collector and additionally greatly reduces the pressure drop through the scrub reservoir.

DETAILED DESCRIPTION OF THE INVENTION

Figure 1:
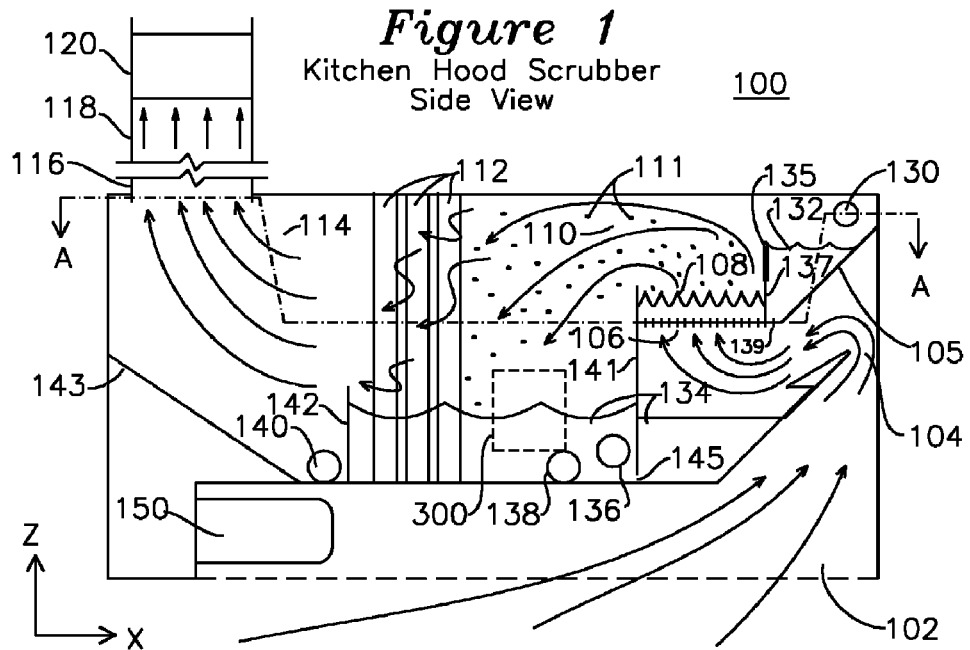
FIG. 1 shows a side section view of a kitchen air hood.
Figure 2:
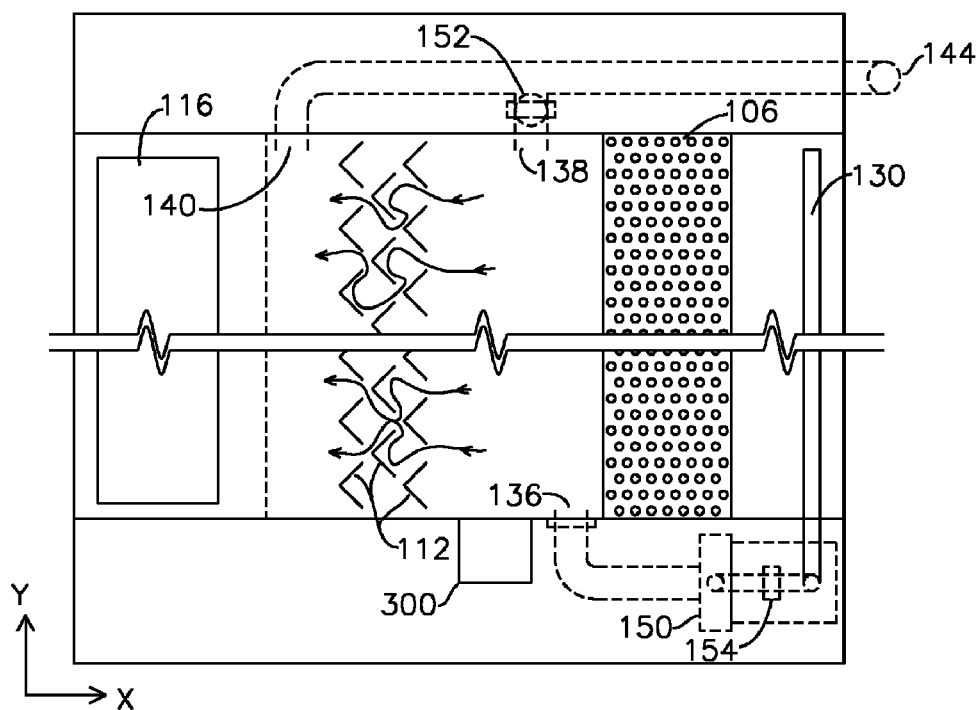
FIG. 2 shows a composite top section view of the scrubber of FIG. 1.

The present invention is best understood with reference to side view FIG. 1, and section A-A of FIG. 1 as shown in composite FIG. 2, which also shows other structures (as dashed lines) projected into the section for reference. The kitchen scrubber hood 100 may have the dimension of a standard kitchen exhaust hood, such as 2' high (z axis) by 4' wide (x axis) by any length (y axis) required. In a vent-only service mode used when the scrub mode is not available such as during service or shutdown operations or during an emergency condition such as clearing smoke from a fire, a cleaning fluid may be present in a main reservoir 134, but pump 150 is not turned on, and scrub reservoir 108 has drained back to main reservoir 134, such that incoming air enters inlet duct 102, passes through the apertures in the lower surface 106 of empty scrub reservoir 108, through the structures of the mist eliminator 112, and through the exhaust outlet. In the normal operational scrubbing mode, fan 120 is operative as well as recirculation pump 150 and flow sensor 154 measuring the output flow of pump 150, and air inlet duct 102 directs incoming contaminated air containing airborne oil droplets and cooking odors with an perimeter of the edge of the hood inlet velocity of 75 to 100 feet per minute (FPM) towards a reduced aperture passageway 104 which accelerates the air flow velocity to 1100 fpm at aperture 104 to avoid retrograde flow of contaminants and cleaning fluid back to the inlet 102, such as may otherwise occur from the turbulence from scrubbing interaction between the contaminated air and cleaning fluid. In one embodiment of the invention, the reduced aperture passageway 104 may comprise a snap-on strip for reducing the x-axis extent of the aperture 104, thereby increasing the incoming air velocity in the reduced aperture region to a desired velocity as high as 1500 FPM, or any air velocity sufficient to prevent incoming contamination particles or water droplets from the scrub reservoir 108 from exiting through aperture 104 towards inlet 102. The contaminated air is directed to wetted surface 105 which draws cleaning fluid from pre-wet apertures 139 in the bottom of an upper reservoir 132 to apertures in the lower surface 106 of the scrub reservoir 108, which serves to keep the scrub reservoir 108 lower surface 106 wetted, which minimizes the accumulation and plugging of the apertures in the scrub reservoir 108 lower surface 106. The contaminated air is thereby directed upwards through scrub reservoir 108 having a porous bottom surface 106, and the resulting efficiency of interaction between contaminates and cleaning fluid may approach or exceed 99% efficiency. The porous bottom surface 106 may be realized using a plurality of apertures which direct the contaminated air through the scrub reservoir 108 and form high velocity jets for interaction with a cleaning fluid such as water mixed with a non-foaming surfactant such as potassium pyrophosphate, and in one embodiment, the cleaning fluid is in the range of 0.1 part to 10 parts of potassium pyrophosphate surfactant in 500 parts water. In one embodiment of the invention, the apertures in the scrub reservoir bottom surface 106 are in the range of 0.125 inch to 0.25 inch and the resulting scrub reservoir lower surface porosity is preferably in the range of 40% to 60%. The scrub reservoir 108 causes oils and particulates in the contaminated air passing through the scrub reservoir 108 to vigorously interact with and mix with the cleaning fluid, such that the majority of contaminates are transferred to the cleaning fluid of the scrub reservoir 108, and the output of the scrub reservoir 108 contains clean air 110 and droplets 111 containing remaining contaminates are mixed and in solution with the cleaning fluid, or alternatively as an emulsion of contaminates and cleaning fluid. The function of the surfactant in the cleaning fluid of the scrub reservoir provides a reduced surface tension which results in highly efficient transfer of the contaminates to the liquid of the reservoir as the jets of contaminated air pass through the enhanced surface area of the cleaning fluid of the reservoir. In one standalone embodiment of the invention, contaminated air is passed through a scrub reservoir having a plurality of apertures, the contaminated air forming jets through the scrub reservoir which contains water and a surfactant, the contaminates remaining in solution with the cleaning fluid, and the output of the scrub reservoir containing cleaned air and droplets of cleaning fluid and contaminates which may be removed in any manner known in the prior art. Additionally, the use of a cleaning fluid which contains water and a surfactant increases the capture of contaminates of the contaminated air, and also reduces the resistance and associated pressure drop through the scrub reservoir. In the system of FIG. 1, the majority of droplets 111 are macro-sized droplets on the order of 0.125 inch to 0.25 inch, and are directed from a +Z axis movement to a −X axis movement through a 90 degree bend in flow to impinge on mist eliminator 112 which is formed from a series of chevrons (such as V shaped surfaces) which form a series of serpentine channels (seen in FIG. 2) such that the macro-sized droplets impinge on the surface of the mist eliminator 112, and drain back to the main reservoir 134. The efficiency of droplet collection through the mist eliminator may approach or exceed 99%, exclusive of the vapor phase moisture which may exhaust. The clean air which remains after aggregation and removal of droplets is directed over the top of a dam 142 which forms one end of the main reservoir 134, thereafter traveling upward to an exhaust vent 116 as directed by sloped surface 143 which leads to an overflow drain 140 used to capture overflow from main reservoir 134 which tops over dam 142 during a cleaning mode described later. For a long kitchen hood, such as a 10 foot (y axis) length, the exhaust vent 116 may be formed from a plurality of linearly arranged rectangular apertures 6" wide by 36" or 44" long, which are aggregated together to form a single duct 118 leading to blower 120 in a remote location such as in an attic or on a facility roof. The overflow drain 140 typically leads to an external drain 144 such as a facility grease trap and drain for facility disposal and treatment of trapped grease and contaminates which drain out of the scrubber 100. Sump drain 138 of the main reservoir is also coupled to the external drain 144 through a stop valve 152 of FIG. 2 for manually emptying the main reservoir 134. The main reservoir 134 also has an intake 136 which is delivered to recirculation pump 150 of FIG. 2, the output of which is directed to an upper reservoir supply 130 which fills upper reservoir 132 which overflows over the top of adjustable spillway 135 above the scrub reservoir 108 such that the upper reservoir 132 fills and uniformly tops over the extent of adjustable spillway 135 to the scrub reservoir 108, which also separate the comparatively low pressure air (outlet) side of septum 141 from the air inlet side. Septum 141 also has a series of passageways 145 below the cleaning fluid surface which connects the main reservoir 134 extent adjacent to fill mechanism 300 with the main reservoir 134 under the scrub reservoir 108. The adjustable spillway or weir 135 is disposed over a spillway support septum 137 which separates the upper reservoir 132 from the scrub reservoir 108, and spillway 135 is capable of being adjusted after installation to create a horizontal spillway surface to uniformly drain from the upper reservoir 132 to the scrub reservoir 108, thereby providing a uniform height spillway for water cascading from upper reservoir 132 to scrub reservoir 108.

The mist eliminator 112 may be formed from a plurality of substantially 2"×2" right angle bent material of height Z of FIG. 1, which right angle bends are arranged in a series of offset chevron patterns, such that each successive mist eliminator row is offset by half of the distance from one mist eliminator chevron to the next as seen in FIG. 2.

Figure 3:
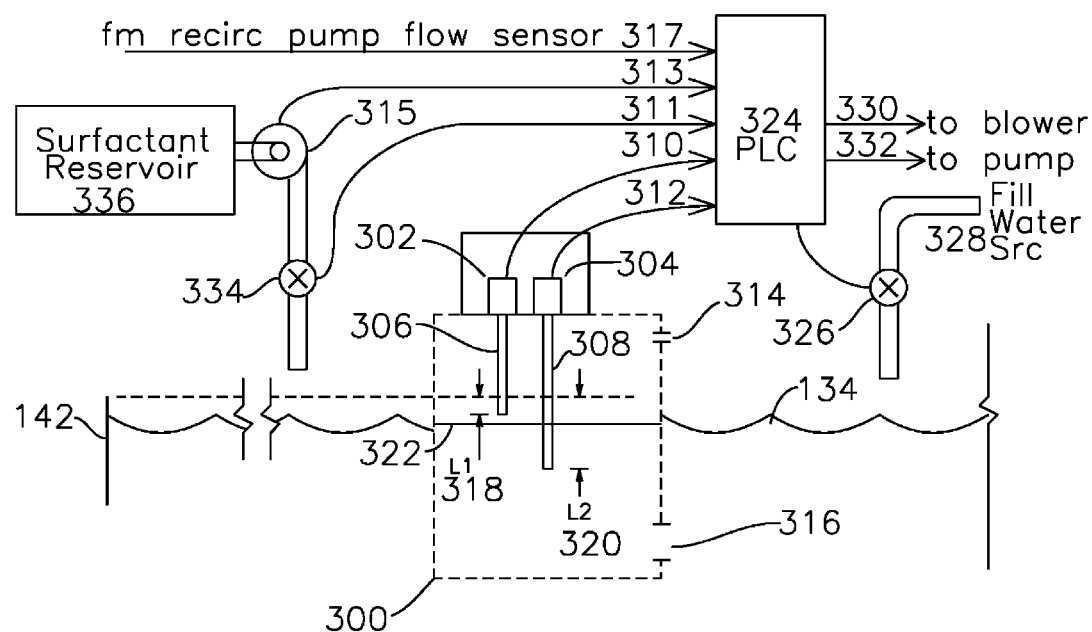
FIG. 3 shows details of the level regulation, fill and surfactant system, and programmable logic controller.

Evaporative and overflow losses are compensated using a fill housing 300 which senses an optimum cleaning fluid level in the main reservoir 134, and allows the introduction of new water to replenish the main reservoir 134 cleaning fluid to a desired level. Typically, surfactant is introduced after the periodic blowdown cycle, where water is introduced which overfills the cleaning fluid from the main reservoir 134 over dam 142 and to the overflow drain 140. During normal scrubbing operation, the main reservoir 134 level is typically below the dam 142 and above the level of recirculation pump inlet pipe 136. The fill mechanism may use any fluid level sensing system of the prior art, including a float valve or conductivity probe. One example embodiment fill mechanism and programmable logic controller (PLC) 324 is shown in FIG. 3, which provides fill housing 300 with a liquid aperture 316 coupled below the surface of the main reservoir 134 and a vent aperture 314 above the main reservoir. The housing 300 may be located anywhere which isolates the level sensors 302 and 304 from water turbulence and short term variations in the main reservoir level, such that the sensors are exposed to average reservoir level 322. A short sensor 302 has a conductive rod 306 which is a first distance L1 318 below the dam 142 level, and a comparatively long sensor 304 has a conductive rod 308 a second distance L2 320 below dam 142 level, with L2>L1. Short sensor 302 is used to control the fill solenoid 326, which when open, allows pressurized water source 328 to add to the cleaning fluid in reservoir 134. Long sensor 308 is used to disable the circulation pump 150 of FIG. 2 to protect against pump damage if the reservoir level falls below a minimum level established by long sensor 304. The operation of the short and long sensors is described in flowchart FIGS. 4A and 4B, which functionality is programmed into the programmable logic controller (PLC) 324 of FIG. 3.

The controller PLC 324 thereby provides control of the main blower 120 of FIG. 1 using control lines 330, the circulation pump 150 of FIG. 2 using control lines 332, the fill solenoid 326, control line 313 directed to the surfactant fluid pump 315 which is capable of metering known amounts of surfactant at controlled flow rates, and flow sensor 334 which provides input 311 which can be used to indicate the absence of surfactant flow during a surfactant demand request using pump 315. PLC inputs 310 and 312 provide reservoir level measurement using short and long level sensors 302 and 304. The PLC additionally accepts recirculating pump flow sensor input 317 from flow sensor 154 of FIG. 2 which indicates flow through the recirculation pump 150 of FIGS. 1 and 2. The functions performed by the PLC upon external request such as from a control panel (not shown) may include the start up sequence shown in FIG. 5, the blow down cycle which performs periodic cleaning without draining the reservoir shown in FIG. 6, introduction of surfactant as shown in FIG. 7, and shutdown sequence shown in FIG. 9.

Figure 4A:
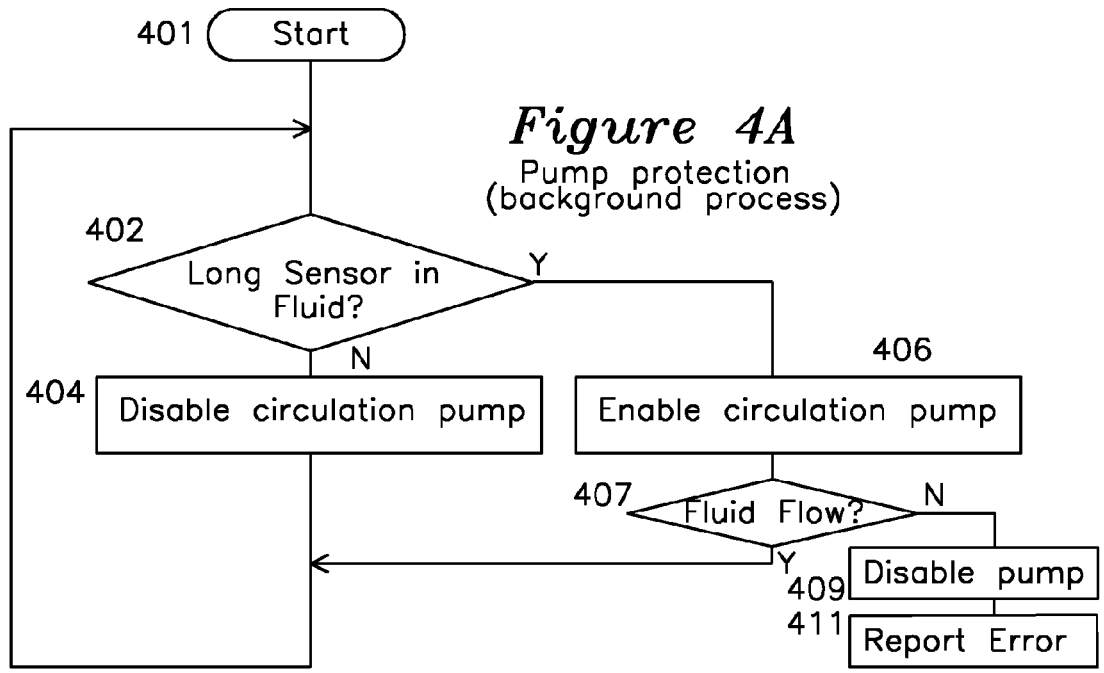
FIG. 4A shows a flowchart for a background pump protection process.
Figure 4B:
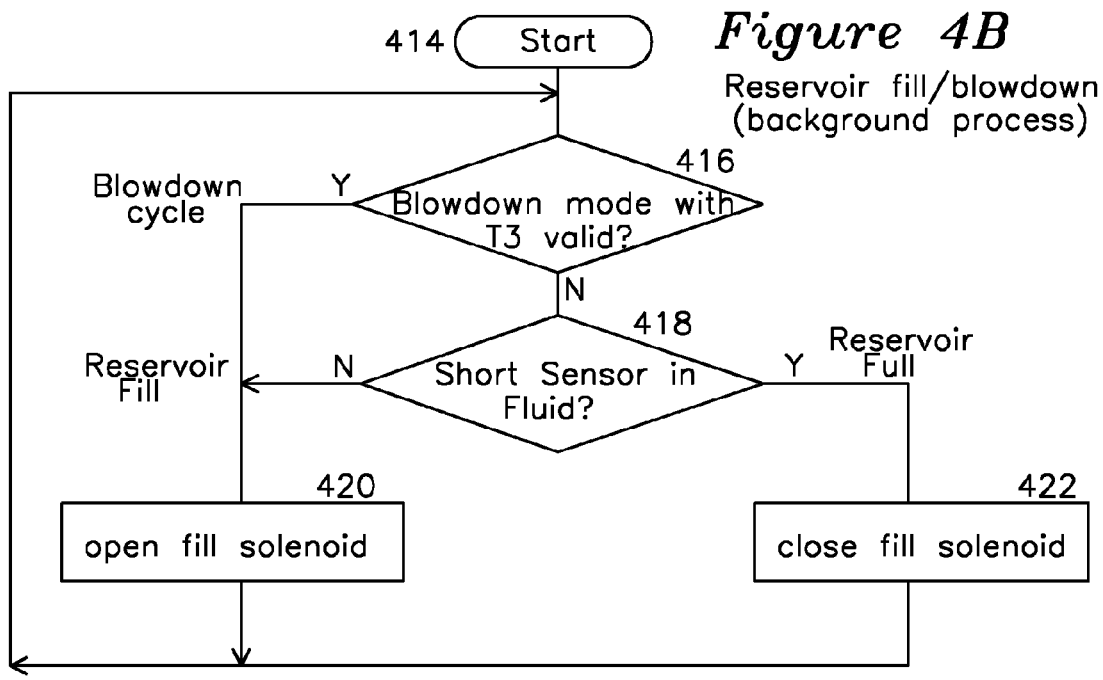
FIG. 4B shows a flowchart for a reservoir fill/blowdown background process.

The pump protection process of FIG. 4A provides continuous protection for the circulation pump against loss of fluid or pump circulation blockage. The process may operate as a background process in the PLC of FIG. 3 and separate from any other process such as those described in FIG. 4B, 5, 6, 7, or 9. The pump protection process starts at step 401, and step 402 detects the long sensor contact with the cleaning fluid of the main reservoir, such as by averaging, sensing and waiting, or any method which provides a reliable indication that the long sensor is in contact with the main reservoir cleaning fluid and accurately detecting a level. If the sensor is not in fluid contact, the circulation pump is disabled 404 until step 402 detects contact and proceeds to step 406 which enables the pump. Fluid flow through the pump is detected in step 407, and if present, the process continues at step 402, but if flow is not detected, the pump is disabled 409 and an error is reported 411 such as by indicator lamp or alarm bell at the front panel (not shown). Similarly for the reservoir fill operation, the process shown in FIG. 4B represents one possible embodiment of a program operative in the PLC 324 of FIG. 3, and once the process is started, steps 416, 418, 420, and 422 operate as a continuous process for either maintaining fluid level, or overfilling the main reservoir for a blowdown mode which passes the excess cleaning fluid to the overflow drain. The reservoir fill process starts 414 and blowdown mode is tested in step 416 by checking to see if blowdown mode is enabled with a valid T3 timer which indicates a blowdown cycle duration timer, as will be described in FIG. 6. If these two conditions are met, the fill solenoid is opened 420. If the unit is not in blowdown mode, the short sensor is examined for fluid contact 418, resulting in either the addition of water to the main reservoir by opening the fill solenoid 420, or the short sensor makes contact indicating a full reservoir, and closing the fill solenoid in step 422.

Figure 5:
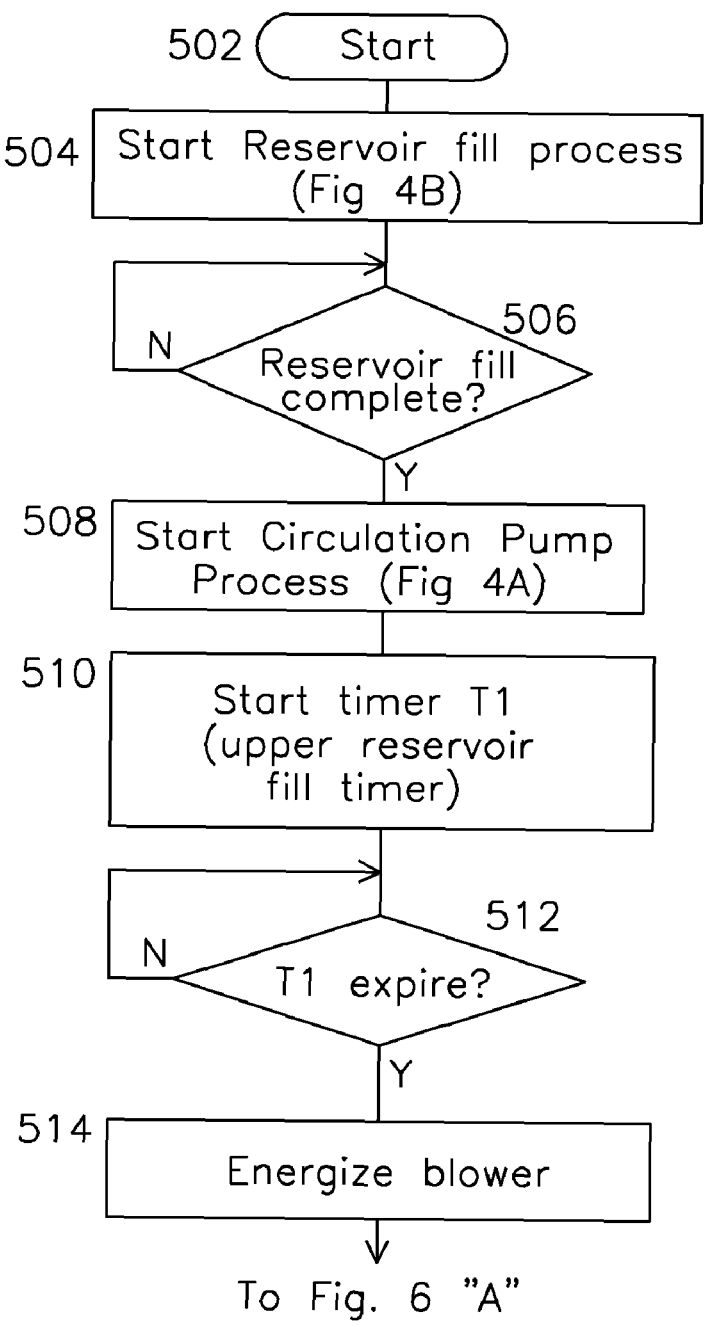
FIG. 5 shows a flowchart for a start-up process of the PLC.

The start-up sequence of FIG. 5 starts 502 with the fill process of FIG. 4B which occurs in step 504. Upon completion of the reservoir fill 506 as determined by the short sensor detecting a full reservoir 422 of FIG. 4B, The circulation pump 150 starts 508 and causes the upper reservoir 132 to fill and spill over the adjustable weir into the scrubbing reservoir 108, and the system fluid levels achieve equilibrium during delay T1 510 and T1 timer expiry 512. As the main reservoir drops during the pumping of fluid to the upper reservoirs of the T1 interval, the background process of FIG. 4B replaces the displaced cleaning fluid to maintain the main reservoir level. The T1 pump start equilibrium interval represents the duration of time for the upper reservoir to overflow into and fill the scrub reservoir, and after the T1 pump start equilibrium interval, the blower is started 514, after which air scrubbing operation is in full effect. For purging of collected oils and contaminates while the system continues to operate, the PLC generates the optional blow-down cycle shown in FIG. 6, entering at step 601 which follows step 514 of FIG. 5, whereby the PLC 324 initializes a blowtime cycle interval timer T2 in step 605 to the default value not_valid, indicating that no blowdown cycle is requested by asserting a not_valid value for the blowdown cycle interval timer T2. The operator settings for the blowdown cycle in step 602 include the programmable blowdown cycle interval time T2 with a typical value of 30 to 60 minutes, and a blowdown cycle duration time T3 with a typical value of 2-3 minutes. Upon application of the blowdown parameters in step 602, the T2 timer is started in step 604, or if not initialized at all, is tested in step 606 which returns to test 602. If the T2 timer is valid but not expired, the process similarly returns to step 602. When the T2 timer is valid and has expired in step 607, the T3 blowdown cycle duration timer is started, during which time the fill sensor ignores level sensor input 310 and opens fill solenoid 326 in step 610 for the blow down cycle interval time T3 which is tested in step 612, during which T3 interval the main reservoir 134 overflows over dam 142, carrying oils and greases to overflow drain 140 for the blowdown cycle duration T3. During this time T3 of step 610, the fill solenoid 326 is maintained open, and after duration T3, the fill valve is closed in step 614 and normal reservoir fill operation of FIG. 4B resumes.

Figure 6:
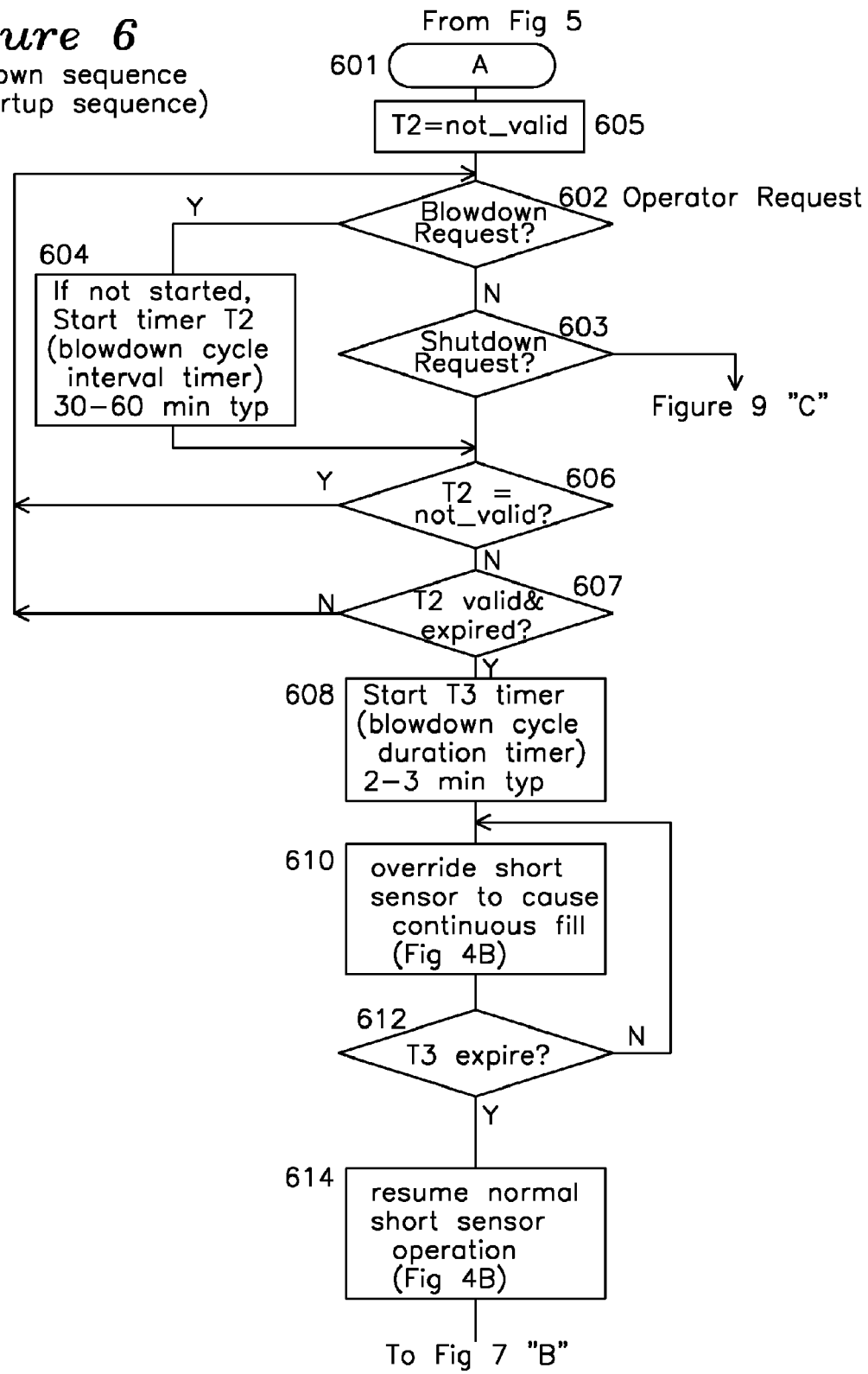
FIG. 6 shows a flowchart for a blow-down sequence of the PLC.
Figure 7:
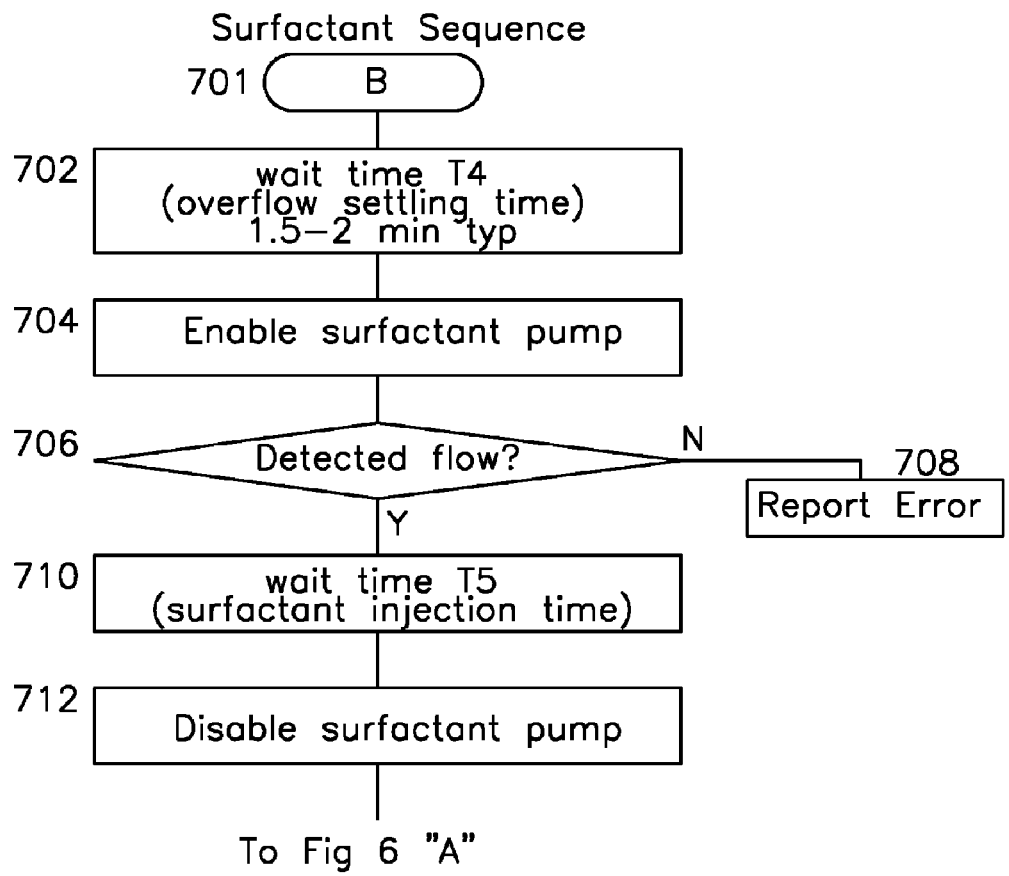
FIG. 7 shows a flowchart for the surfactant sequence of the PLC.

Following the blowdown cycle at the end of step 614, FIG. 7 shows a surfactant control process, which is advantageously performed when the surfactant concentration is known. After a settling time T4 702 during which the excess cleaning fluid displaced by the fill water drains to the overflow drain, the surfactant pump is enabled in step 704, surfactant flow is detected 706, and the surfactant pump continues to operate for a surfactant injection duration time T5 710, after which the surfactant pump is turned off in step 712. The failure to detect surfactant flow in step 706 causes an error condition 708, such as the sounding of an alarm or the disabling of the circulation pump 150. The objective of the surfactant introduction sequence is to maintain the concentration of surfactant in the main reservoir to an optimum range such as was described previously, and the introduction of surfactant after the blowdown cycle of FIG. 6 is one way of accomplishing this objective, and is presented not to limit the invention to this method, but to aid in the understanding of the operation of the invention.

Figure 9:
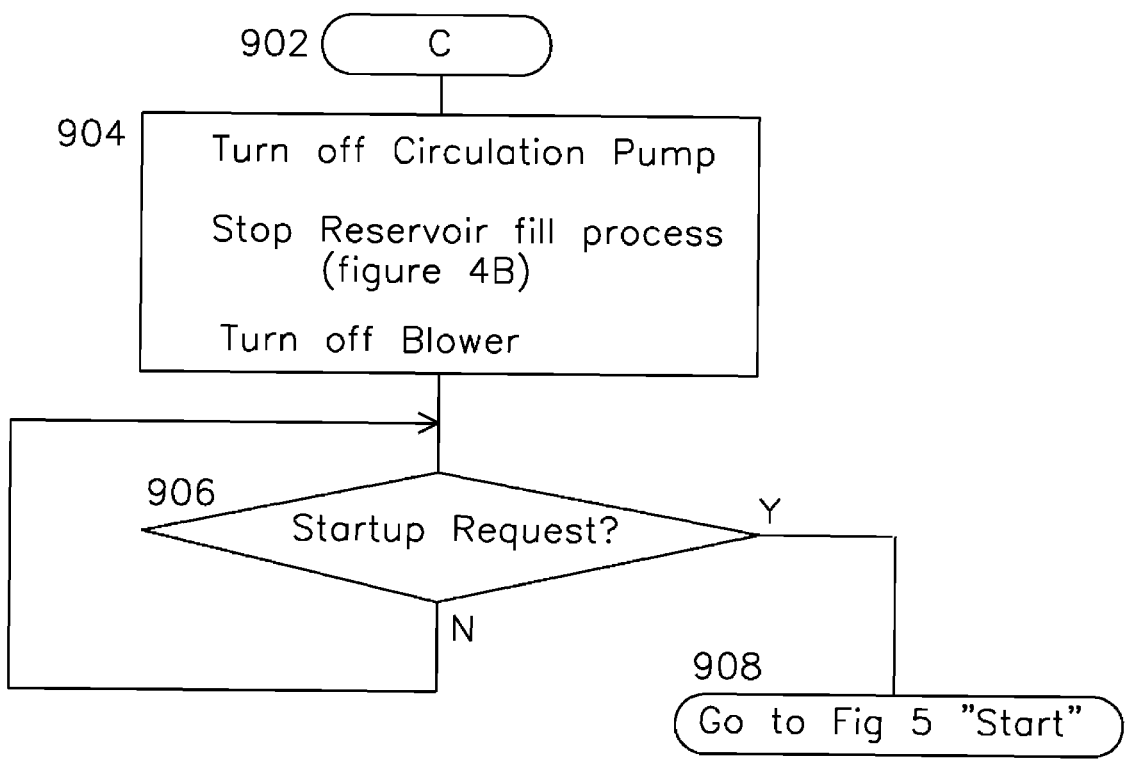
FIG. 9 shows a flowchart for a shutdown sequence of the PLC.

FIG. 9 shows a shutdown sequence which may be entered upon user request from step 603 of FIG. 6. The shutdown sequence entry point of step 902 is followed by step 904 which shuts off the circulation pump, stops the reservoir fill process of FIG. 4B, and turns off the blower in step 904, finally waiting for a startup request in step 906, upon which the process transfers to the startup cycle of FIG. 5.

Figure 8:
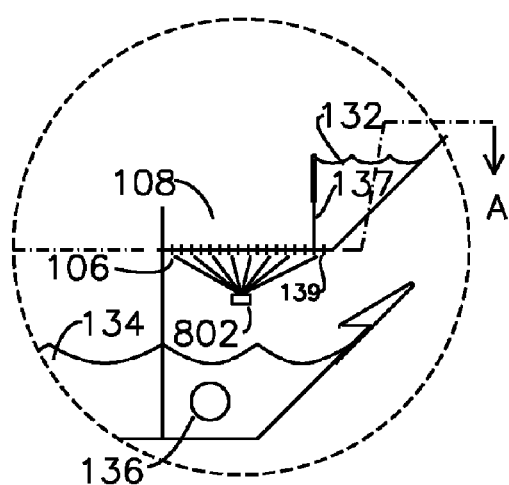
FIG. 8 shows a diagram for a self-cleaning scrub reservoir.

FIG. 8 shows another embodiment of the invention, where hot water spray nozzle 802 is added to the structures described in FIG. 1. The lower surface 106 apertures of the scrub reservoir 108 may become plugged with congealed grease over time, for which a thorough cleaning mode may be provided by spraying lower surface 106 with hot water delivered to spray nozzle 802, which operation may be done under manual control, or using a hot water solenoid under the control of PLC 324 described earlier. In another embodiment of the invention, multiple spray nozzles 802 are positioned over various inner surfaces of the air cleaner 100, including the main reservoir 134, the upper reservoir 132, scrub reservoir 108, and any other surfaces which may accumulate grease and oils, and after draining the main sump, the nozzles are charged with pressurized hot water and detergent with a temperature in excess of the 105° F. melting point of grease, and the sump drain 138 opened during the cleaning cycle. The PLC allows default values as well as independent programming of each of the time parameters T1 (blower startup delay following circulation pump start, which fills the upper reservoir, spilling water into the scrub reservoir, thereby delaying operation of the blower until the scrub reservoir is filled), T2 (blowdown cycle interval—the interval between blowdown cycles), T3 (blowdown cycle duration timer—the duration of a blowdown cycle), T4 (overflow settling time after shutoff of the circulation pump causes cleaning fluid from upper reservoir and scrub reservoir drain back into the main reservoir, over the spillway, and into the overflow drain), T5 (surfactant injection time). Additionally, it is possible to change the order or manner of operation from the examples shown in FIGS. 4A, 4B, 5, 6, 7, and 9.

The hood scrubber thereby provides several advantages over the prior art. The scrub reservoir 108 contains cleaning fluid such as water mixed with surfactant, which is non-flammable, and acts as a flame barrier, extinguishing flames which enter the scrubber. The scrubber intrinsically satisfies the flame controls tests required under Underwriter Laboratories standard 710 (UL-710), which prior art devices satisfy using a separate flame control system apart from the vent mechanism. Another advantage is the ability of the kitchen hood to operate in a "normal" hood mode, whereby the blower 120 can be turned on without circulation pump 150 for ventilation without cleaning. The overflow drain 140 in conjunction with fill solenoid 326 of FIG. 3 provides "blowdown" cleaning mode, whereby excess oils which collect at the surface and in emulsion with the fluid of the main reservoir are spilled over dam 142 and removed from the system.

The present description of the vent hood and air scrubber is provided for understanding of the invention, and is not intended to limit the scope of the invention. Structures such as the scrub reservoir 108 and apertures of the lower surface 106 may be practiced any number of ways, including regular arrays of apertures, round, oval, or square apertures, or other structures such as meshes which provide interaction between the cleaning fluid and contaminated air. Certain other porous structures may be substituted in the scrub reservoir to improve cleaning fluid interaction and trapping, or to improve flame control. The drain valve is shown as a manual valve, but could be an automatic valve with cleaning functionality incorporated into the PLC. Any cleaning fluid which provides emulsification of oils, solution of fats, or solubility with particulates such as smoke may be used. The level sensors of FIG. 3 may be practiced any number of ways, including float sensors, ultrasonic level sensors, or any prior art method for sensing the level of a fluid. The mist eliminators are shown as chevron structures which are suitable for capture of large droplets of contaminates, but may alternatively be any structure which captures droplets and returns them to the main reservoir for re-use.

What is claimed is:

1. An air scrubber having:
   an air inlet admitting contaminated air from a lower surface;
   a main reservoir containing a cleaning fluid;
   a reduced aperture flow passageway for increasing an air flow velocity of contaminated air from said air inlet, said reduced aperture flow passageway formed by the gap between a rigid vertical surface of said air inlet and an angled rigid extension of the bottom surface of said main reservoir which also forms one side of said main reservoir;
   a folded duct directing said contaminated air substantially upward from said reduced aperture flow passageway to impinge onto a wetted surface, thereafter directing said contaminated air substantially downward to impinge onto the surface of said reservoir, thereafter directing said contaminated air substantially upward through a scrub reservoir;
   said scrub reservoir having a lower surface with a plurality of apertures for the passage of said contaminated air, said contaminated air passing through said apertures and thereby forming jets through said scrub reservoir, said jets causing said contaminated air to interact with a cleaning fluid in said scrub reservoir, thereby forming cleaned air and droplets containing said cleaning fluid mixed with contaminates extracted from said contaminated air;
   said cleaned air and droplets passing through a mist eliminator having a plurality of chevrons arranged in sequential rows, said mist eliminator capturing said droplets and draining them to said main reservoir, said cleaned air directed to an exhaust vent conveying said cleaned air;
   a pump for moving the contents of said main reservoir to an upper reservoir having a spillway which empties into said scrub reservoir;
   where said reduced aperture flow passageway increases the flow of contaminated air to a velocity sufficient to prevent retrograde flow of contaminates and cleaning fluid from said scrub reservoir to said air inlet.

2. The air scrubber of claim 1 where said mist eliminator comprises rows of substantially right angle structures, each row offset from an adjacent row by half of the spacing from one said row to another said row.

3. The air scrubber of claim 1 where said wetted surface is wetted from one or more apertures in said upper reservoir which drains cleaning fluid in said upper reservoir to a surface common to said scrub reservoir lower surface.

4. The air scrubber of claim 1 where said cleaning fluid is water and a non-foaming surfactant.

5. The air scrubber of claim 1 where said main reservoir is located below a horizontal extent of said scrub reservoir and said mist eliminator.

6. The air scrubber of claim 1 where said reduced aperture flow passageway includes an adjustable gap.

7. The air scrubber of claim 6 where said reduced aperture is formed by an adjustable baffle placed over said main reservoir edge.

8. The air scrubber of claim 1 where said upper reservoir spillway includes an adjustable spillway placed over a septum formed by one side of said upper reservoir.

9. The air scrubber of claim 1 where said cleaning fluid is water and a surfactant is in the range of 0.1 part to 10 parts of potassium pyrophosphate surfactant to 500 parts water.

10. The air scrubber of claim 1 where said main reservoir includes an overflow dam draining to an overflow drain, said main reservoir also coupled to a cleaning fluid level control, said fluid level control having a short rod at a level which enables a solenoid valve for adding water to said main reservoir when said short rod is not in contact with said main reservoir fluid level.

11. The air scrubber of claim 10 which includes a blowdown mode, whereby for a duration of time T3 blowdown cycle time, said solenoid valve is continuously activated for the addition of water to said reservoir, said T3 occurring each T2 blowdown interval of time, where said T2>said T3.

12. The air scrubber of claim 11 where following said T3 blowdown cycle, and following a T4 overflow settling time, a known volume of surfactant is introduced into said main reservoir.

13. The air scrubber of claim 10 where a jet sprays hot water on said scrub reservoir apertures during a cleaning cycle.

14. An apparatus having:
   a lower air inlet drawing contaminated air upwards into a vertical passageway and thereafter through a reduced width passageway to create a region of increased air velocity, said reduced width passageway formed in the gap between a vertical surface of said vertical passageway and an extended edge of a lower main reservoir, said reduced width passageway causing said contaminated air to increase velocity and to impinge onto a wetted surface which is opposite the surface forming an upper reservoir;

said upper reservoir having a weir for uniformly spilling excess amounts of cleaning fluid onto a scrub tray, said upper reservoir having an aperture for dispensing cleaning fluid from said upper reservoir onto said wetted surface, said wetted surface directing said contaminated air downward to the surface of a reservoir after impingement of said contaminated air upon said wetted surface, said impingement capturing particles of contaminants striking said wetted surface and draining them back to a main reservoir;

said contaminated air thereafter directed upward through apertures in said scrub tray, said scrub tray containing cleaning fluid delivered from said upper reservoir weir; said contaminated air passing through apertures in a lower surface of said scrub tray and generating jets which form droplets containing contaminates from said contaminated air, and clean air;

a first demister formed from a plurality of V-shaped structures and placed to impinge onto an airflow containing said contaminated fluid droplets and clean air, said demister draining captured fluid droplets onto said main reservoir;

said main reservoir containing a sump pump and pumping said cleaning fluid to said upper reservoir;

where said reduced aperture flow passageway increases the flow of contaminated air to a velocity sufficient to prevent retrograde flow of contaminates and cleaning fluid from said scrub reservoir to said air inlet.

15. The apparatus of claim 14 where said cleaning fluid is a mixture of water and a non-foaming surfactant.

16. The apparatus of claim 14 where said reduced width passageway causes an airflow velocity of at least 1100 feet per minute.

17. The apparatus of claim 14 where said reduced width passageway causes an airflow velocity sufficient to prevent droplets from said scrub tray from exiting through said lower air inlet.

18. The apparatus of claim 14 where said scrub tray apertures have a porosity of 40% to 60%.

19. The apparatus of claim 14 where said cleaning fluid is water with 0.1 to 10 parts of potassium pyrophosphate in 500 parts of water.

* * * * *